July 23, 1935.   O. A. OLMSTEAD   2,008,795
CONVERTER PUNCHING MACHINE
Filed May 9, 1931   10 Sheets-Sheet 1

INVENTOR
O. A. Olmstead
BY Murray O. Hayes
ATTORNEY

July 23, 1935.　　O. A. OLMSTEAD　　2,008,795
CONVERTER PUNCHING MACHINE
Filed May 9, 1931　　10 Sheets-Sheet 5
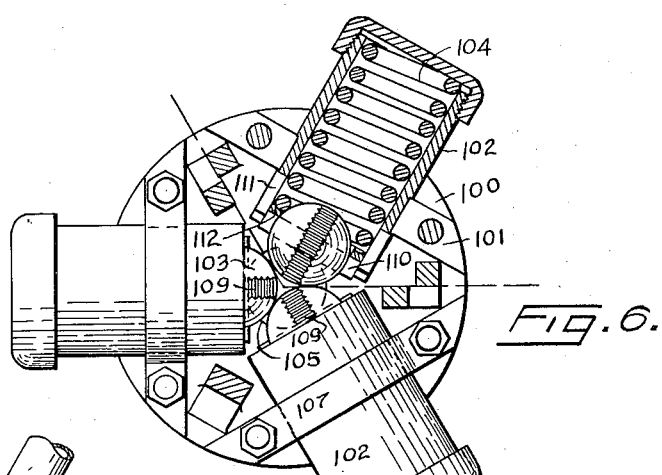
Fig. 6.
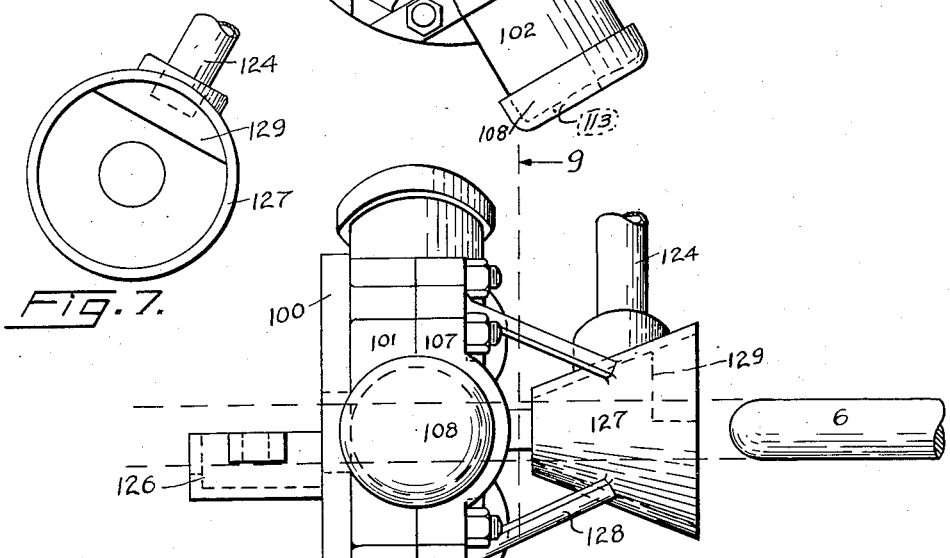
Fig. 7.
Fig. 8.
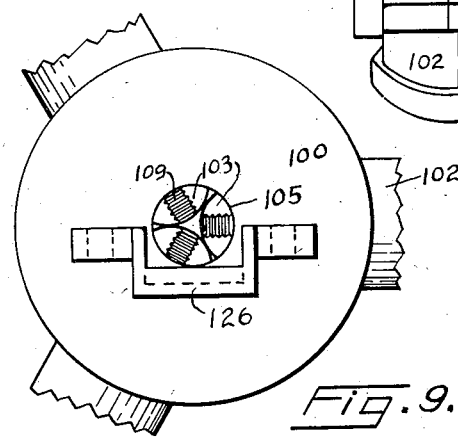
Fig. 9.
INVENTOR
O. A. Olmstead
by Murray O. Hayes
ATTORNEY July 23, 1935.　　　O. A. OLMSTEAD　　　2,008,795
CONVERTER PUNCHING MACHINE
Filed May 9, 1931　　　10 Sheets-Sheet 7

INVENTOR
O. A. Olmstead
BY Murray O. Hayes.
ATTORNEY

July 23, 1935. O. A. OLMSTEAD 2,008,795
CONVERTER PUNCHING MACHINE
Filed May 9, 1931 10 Sheets-Sheet 8

INVENTOR
O.A. Olmstead
by Murray O. Hayes
ATTORNEY

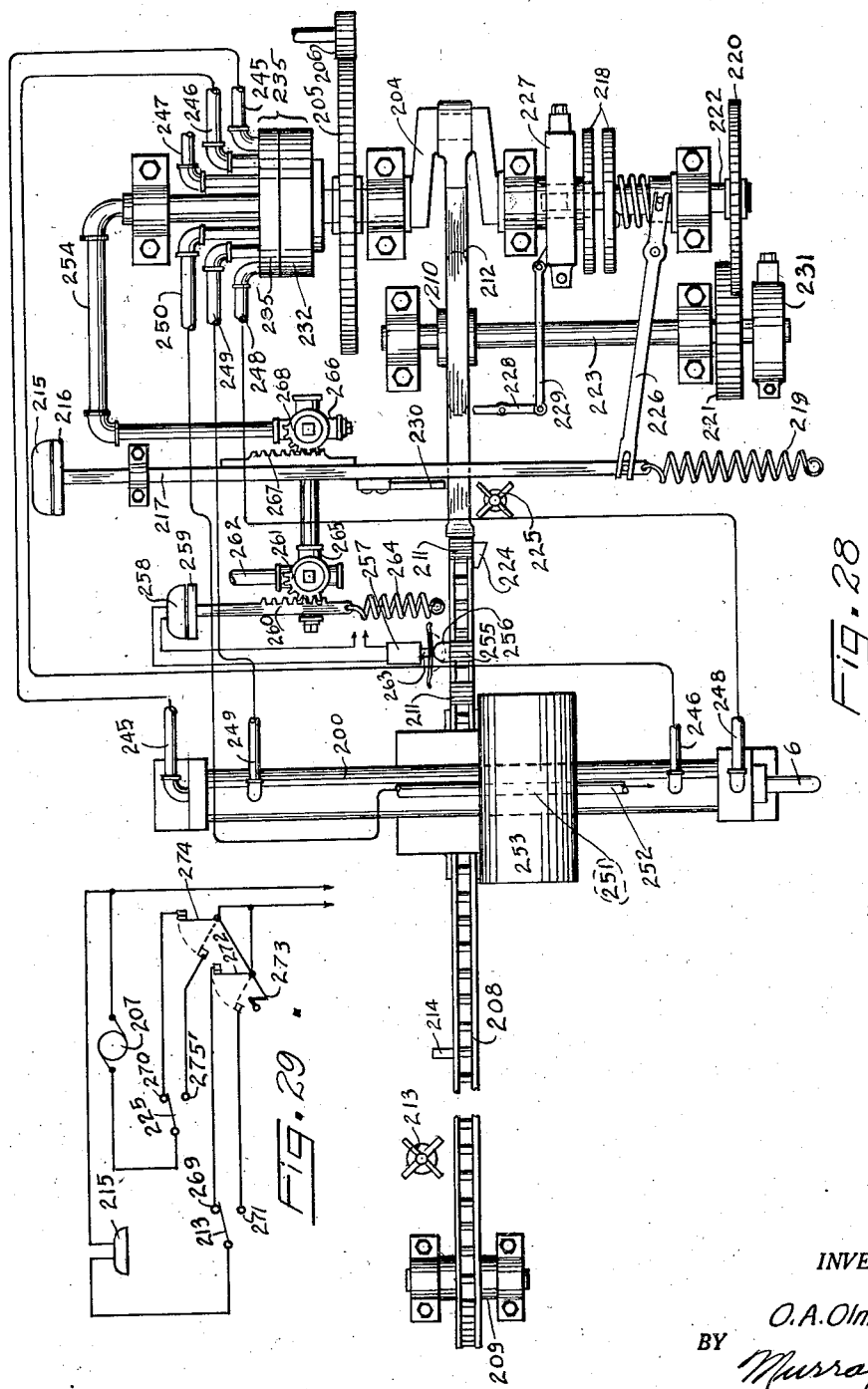

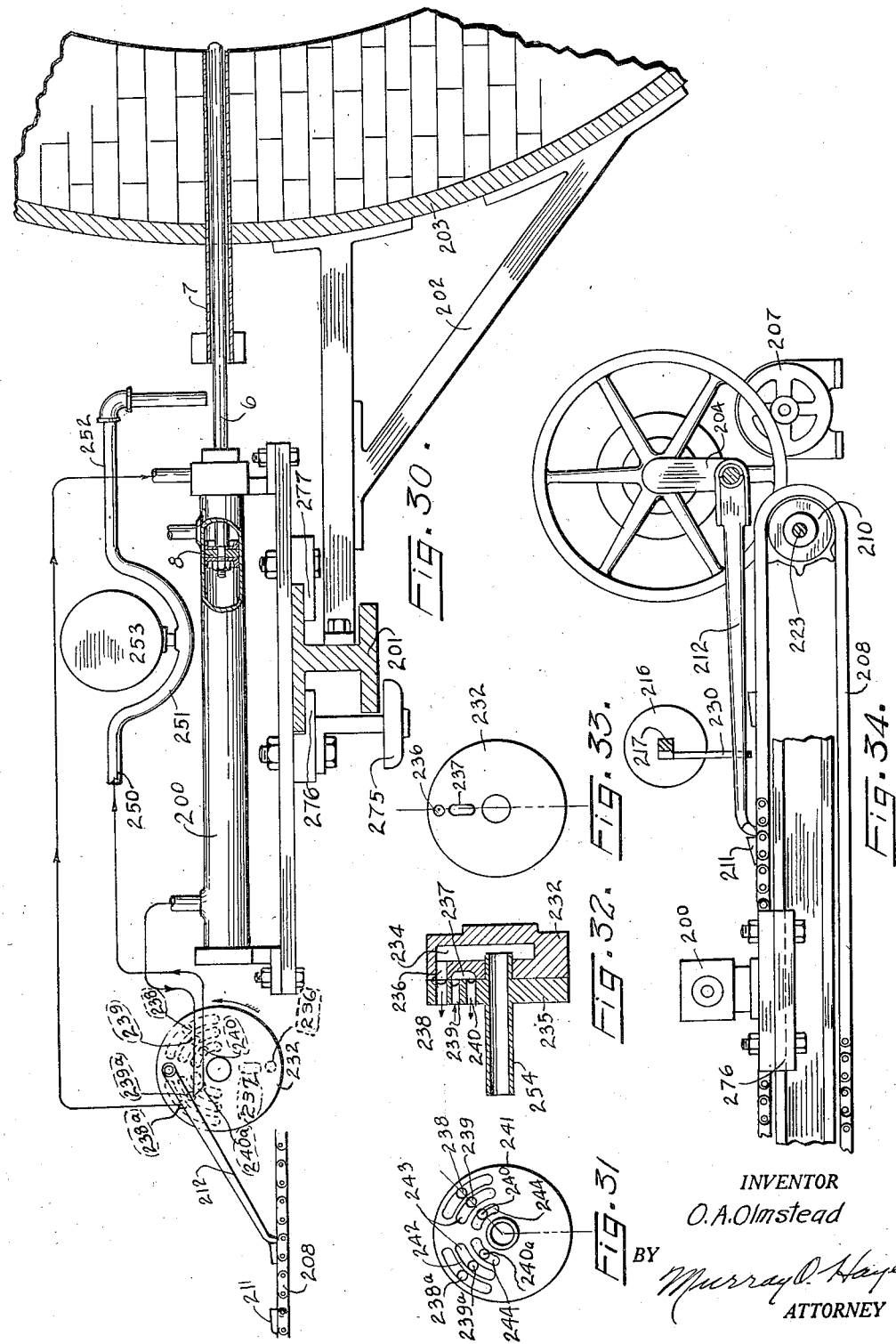

Patented July 23, 1935

2,008,795

UNITED STATES PATENT OFFICE 2,008,795

CONVERTER PUNCHING MACHINE

Oscar A. Olmstead, Salt Lake City, Utah

Application May 9, 1931, Serial No. 536,202

18 Claims. (Cl. 266—42)

This invention relates to a mechanism for punching the tuyères of converters used in metallurgical work, and has among its objects to devise a machine of the kind mentioned which successfully perform the operation of punching tuyères, heretofore done by hand, at a large saving over the cost for hand labor, which will be of simple construction, and will be capable of working at the different angles necessitated by the tilting of the converter at varying loads in the course of the heat.

Figure 10:
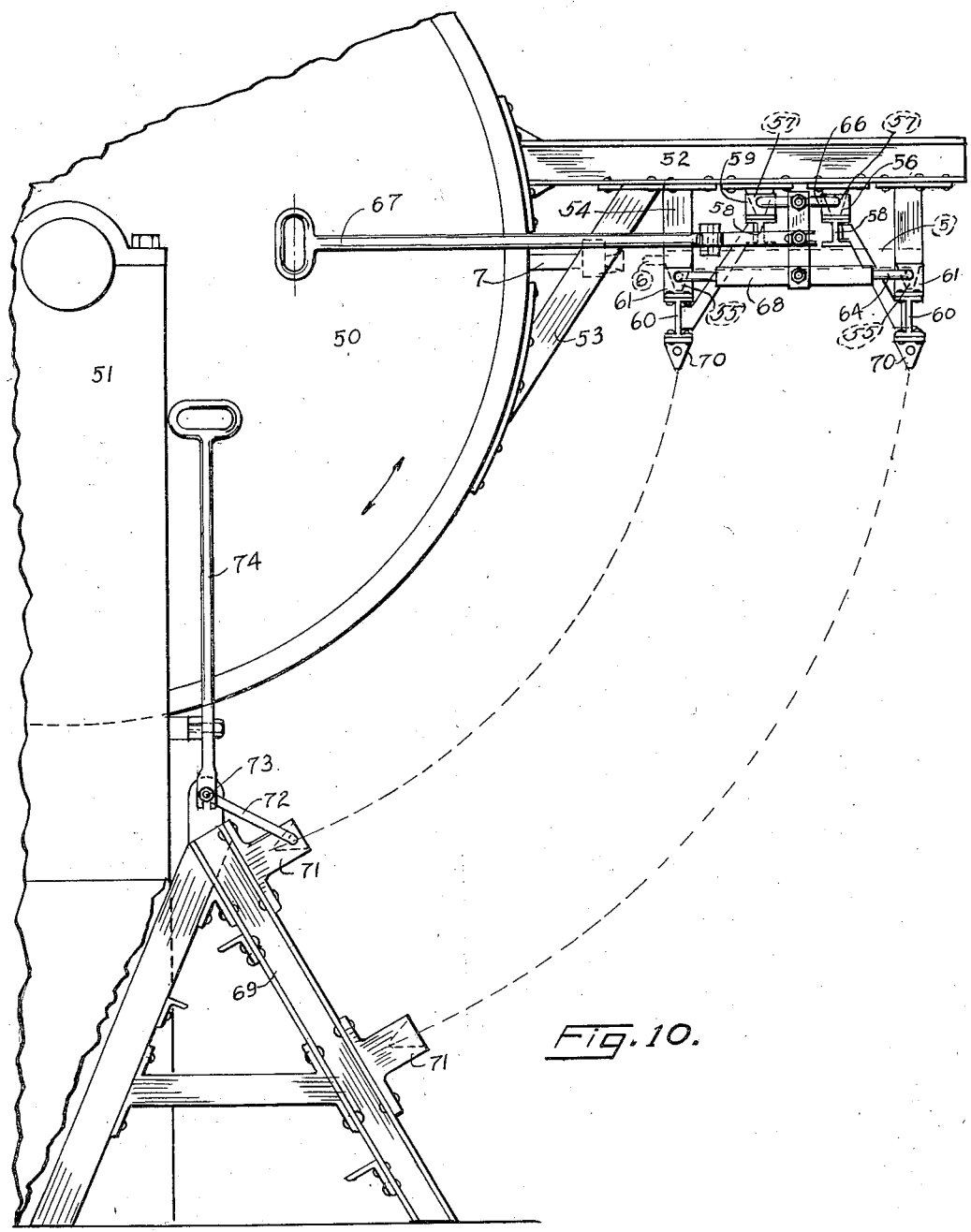
Figure 11:
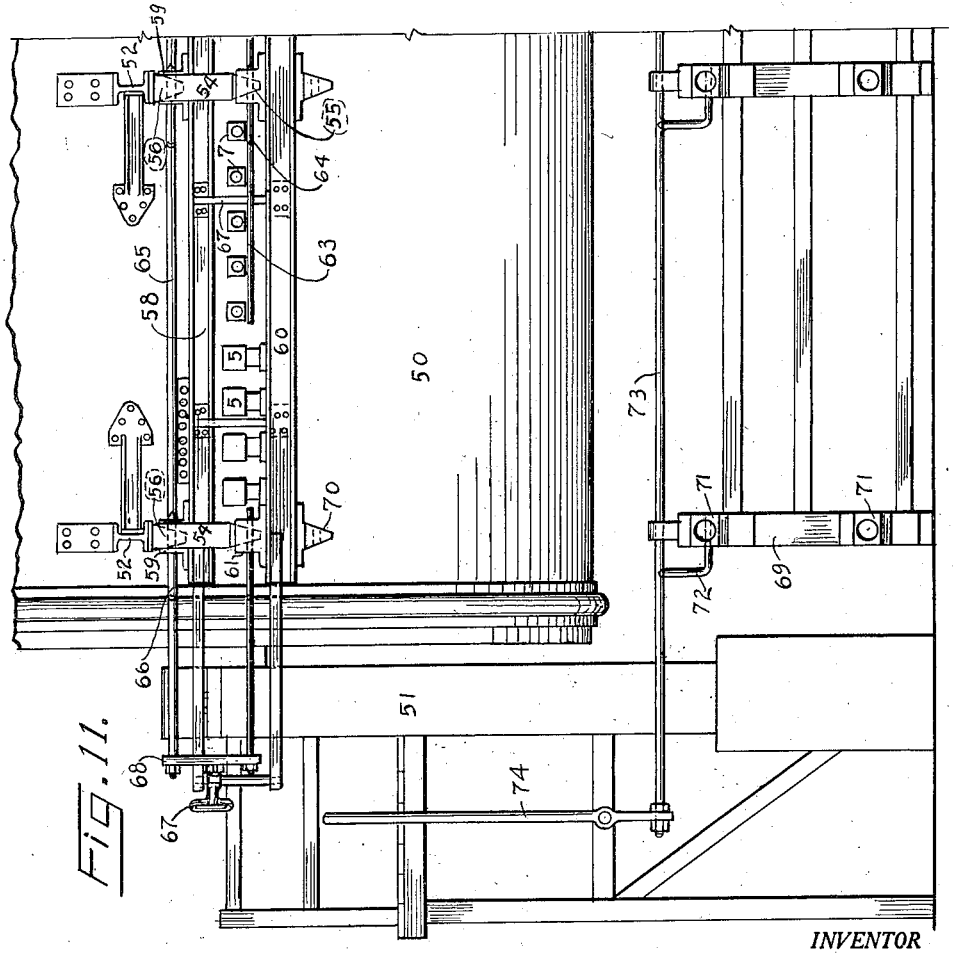
Figure 13:
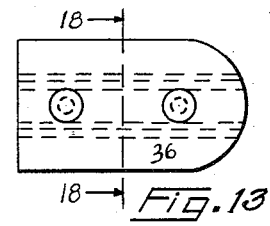
Figure 14:
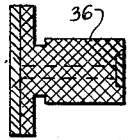
Figure 15:
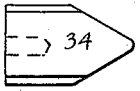
Figure 17:
Figure 18:
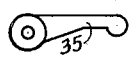
Figure 19:
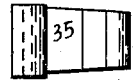
Figure 16:
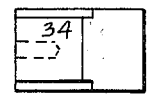
Figure 20:
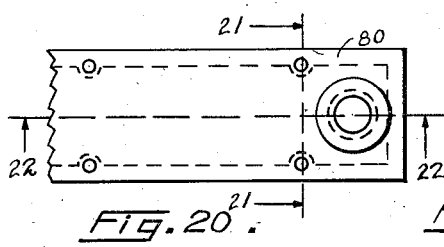
Figure 21:
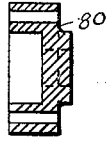
Figure 22:
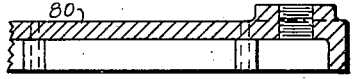
Figure 23:
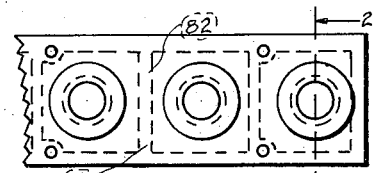
Figure 24:
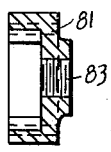
Figure 25:
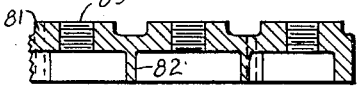
Figure 26:
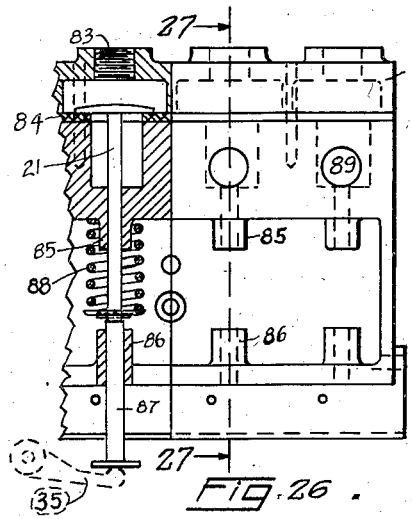
Figure 27:
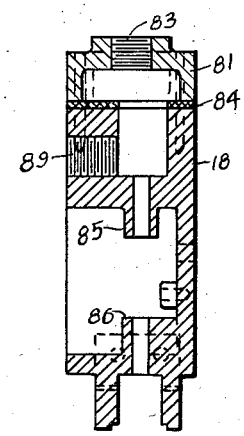

Figs. 6, 7, 8, and 9 are details of the bar guide and bar cleaning device;

Fig. 10 is an end view of a detachable modification, and Fig. 11 is a side view thereof;

Fig. 12 is a plan view of a locking device of the detachable modification above mentioned;

Figs. 13 and 14 are respectively a bottom plan view and a sectional view on the line 18—18, Fig. 13, of the lubricating pad;

Figs. 15, 16, and 17 are respectively top plan view, side elevation, and end elevation of the valve actuating cam;

Figs. 18 and 19 are details of the rocker arm;

Fig. 20 is a plan view of the head of the intake valve box, and Figs. 21 and 22 are sections thereof on the lines 25—25 and 26—26 on said figure;

Fig. 23 is a plan view of the head of the exhaust valve box, and Figs. 24 and 25 are sections thereof on the lines 28—28 and 29—29 on said figure;

Fig. 26 is a top plan view of one of the valve boxes, with a portion cut away to show the details of the valve construction;

Fig. 27 is a section on the line 31—31, Fig. 26;

Fig. 28 is a plan view of a modification which uses but one cylinder;

Fig. 29 is a wiring diagram of the electrical circuits of the modification shown in Fig. 28;

Fig. 30 is a side elevation of the last-mentioned modification, with lines showing the flow of air therein;

Fig. 31 is an end view of parts which are shown in Fig. 30;

Figs. 32, 33, and 34 are details of the rotary valve used with this modification.

The tuyères of metallurgical converters must be kept open so that access of air to the interior of such converters is unimpeded, and to do this it is necessary that the slag and other material which hardens at the inner ends of the tuyères be broken away frequently. This is at present done by men passing along the tuyères and inserting bars into them wherewith the aforesaid materials are broken away. As the heat progresses the quantity of material in the converter decreases and the converter must be rotated to keep the surface of such material adjacent the tuyères, and therefore any machine which is used to punch the tuyères must be capable of operating at any angle from horizontal to as much as sixty degrees from horizontal. The present invention was made to provide a device which can operate under all conditions and positions of service.

Figure 3:
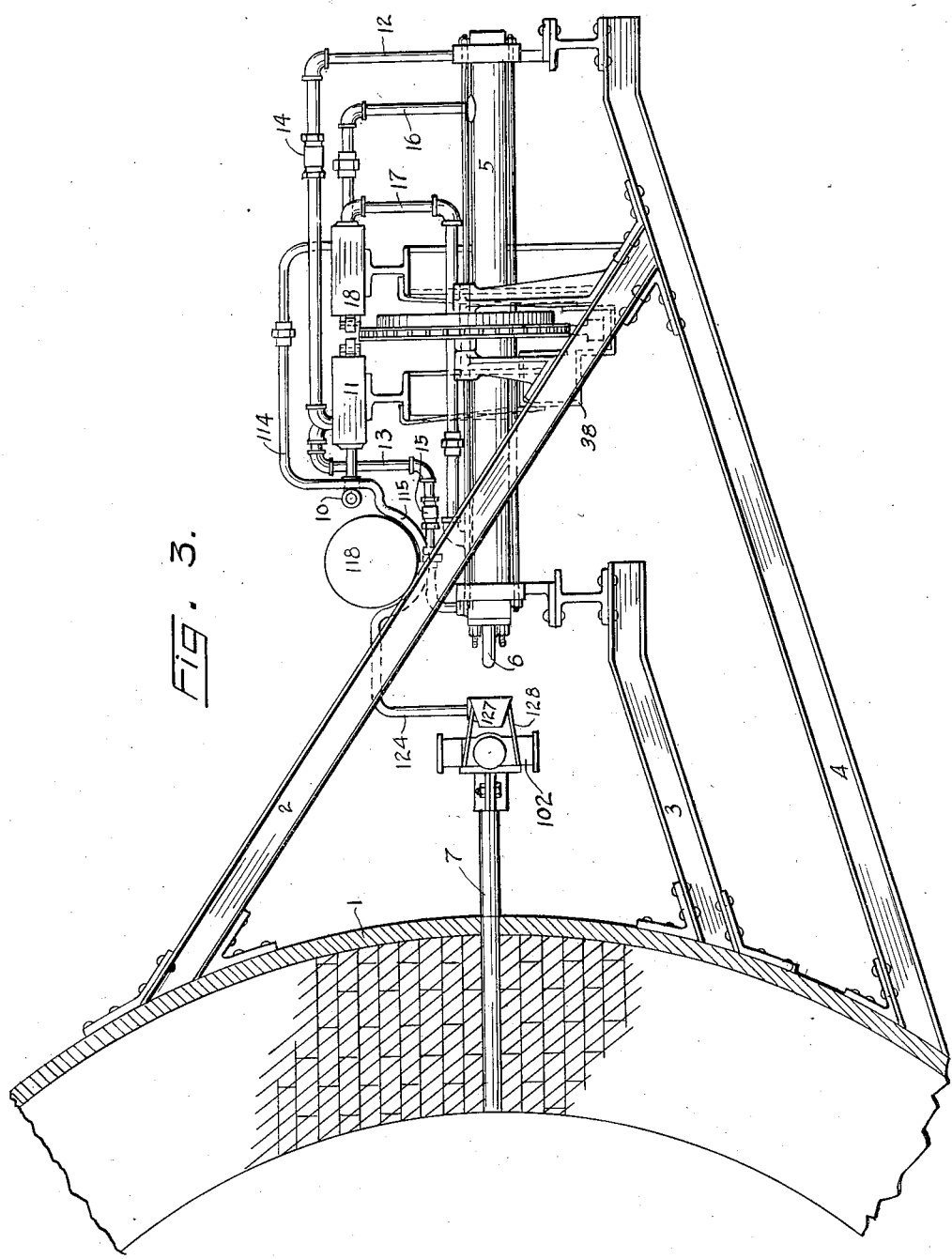
Fig. 3 is an end elevational view.
Figure 4:
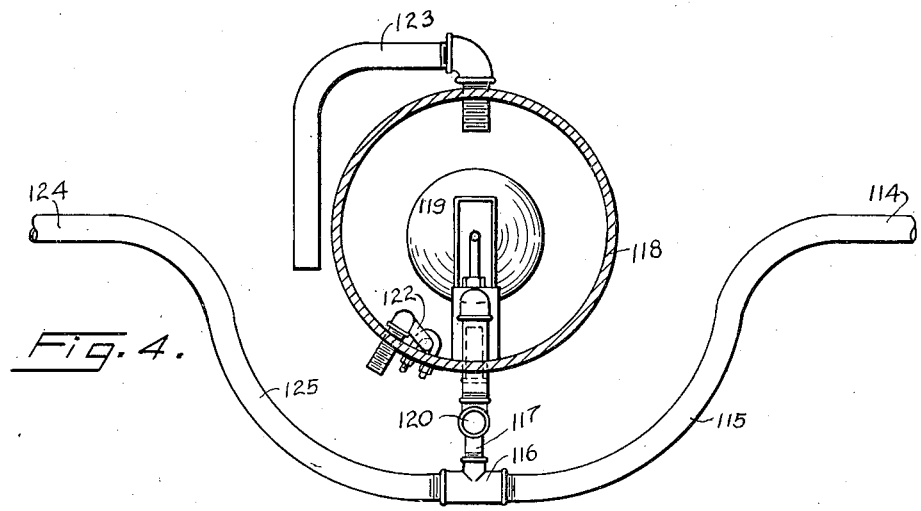
Figs. 4 and 5 are detail views of a device for applying lime wash to the punching bar.
Figure 5:
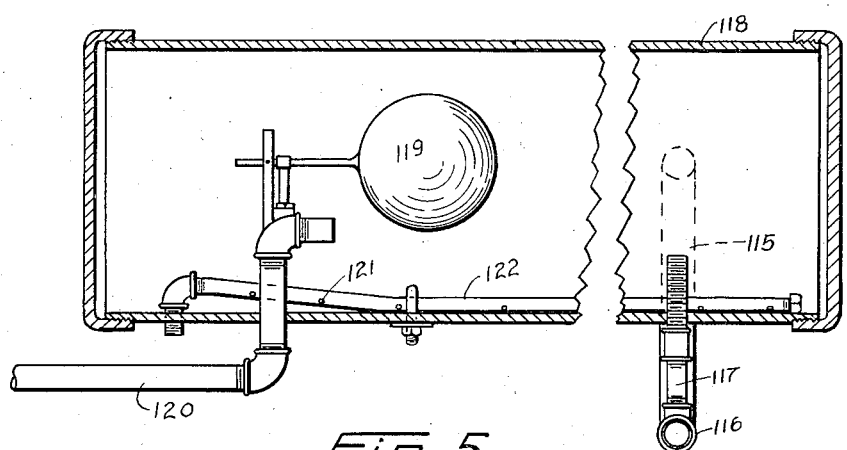

A supporting structure of any suitable kind is fixed to the converter shell 1, in the present instance being made up of I-beams 2, 3, and 4, as shown in Fig. 3, secured together to make a sufficiently strong and rigid assembly to support the mechanism so it will remain in proper position. On said structure are mounted cylinders 5 whereof one is disposed opposite each tuyère 7 of the converter, and in each of said cylinders is slidably mounted a punching bar 6 adapted to be actuated to pass into tuyère 7 to break loose any slag or other material which has accumulated at the inner end of said tuyère in a manner to interfere with the passage of air therethrough. The inner end of bar 6 carries a piston 8 which has a tight fit in said cylinder and is provided with a compression cup 9 on each side thereof, so that said piston is double-acting.

Air under pressure greater than atmospheric, up to one hundred pounds per square inch, depending upon the diameter of the cylinders used, is carried in a supply line 10 to the intake valve boxes 11, whence the said air passes through pipe 12 to the outer end of cylinder 5 to act on piston 8 to cause bar 6 to move out of said cylinder to punch tuyère 7, and through pipe 13 to the inner end of said cylinder to retract bar 6. Check valves 14 and 15 are placed in pipes 12 and 13 to prevent movement of piston 8 toward said pipes from forcing air back therethrough. Retardation of said piston through compression of air in front thereof is prevented by exhaust valves in the valve box 18 permitting such air to escape through pipes 16 and 17. The points of connection of said exhaust pipes with said cylinder are somewhat spaced from the ends of said cylinder to provide an air cushion at the end of the stroke of bar 6, to prevent damaging of the heads of said cylinder through impact of said bar against said heads; mechanical cushions of suitable resilient material may be used in addition if desired. The air from pipe 17 passes through the valve in box 18 and thence to the open air, but that from pipe 16, which is on the return stroke of bar 6, is carried from the valve through pipe 114 to apply a lime wash to bar 6, as will be hereinafter fully set forth.

The valve system for controlling the flow of air to and from the cylinders 5 is shown in Fig.

1. The valves for inlet of air are enclosed in valve box 11, while those for the exhaust of air from said cylinders are in box 18, the said boxes each containing the valves for a group of four cylinders, there being an intake valve and an exhaust valve for each end of each cylinder, making eight valves in each of said boxes.

Figure 1:
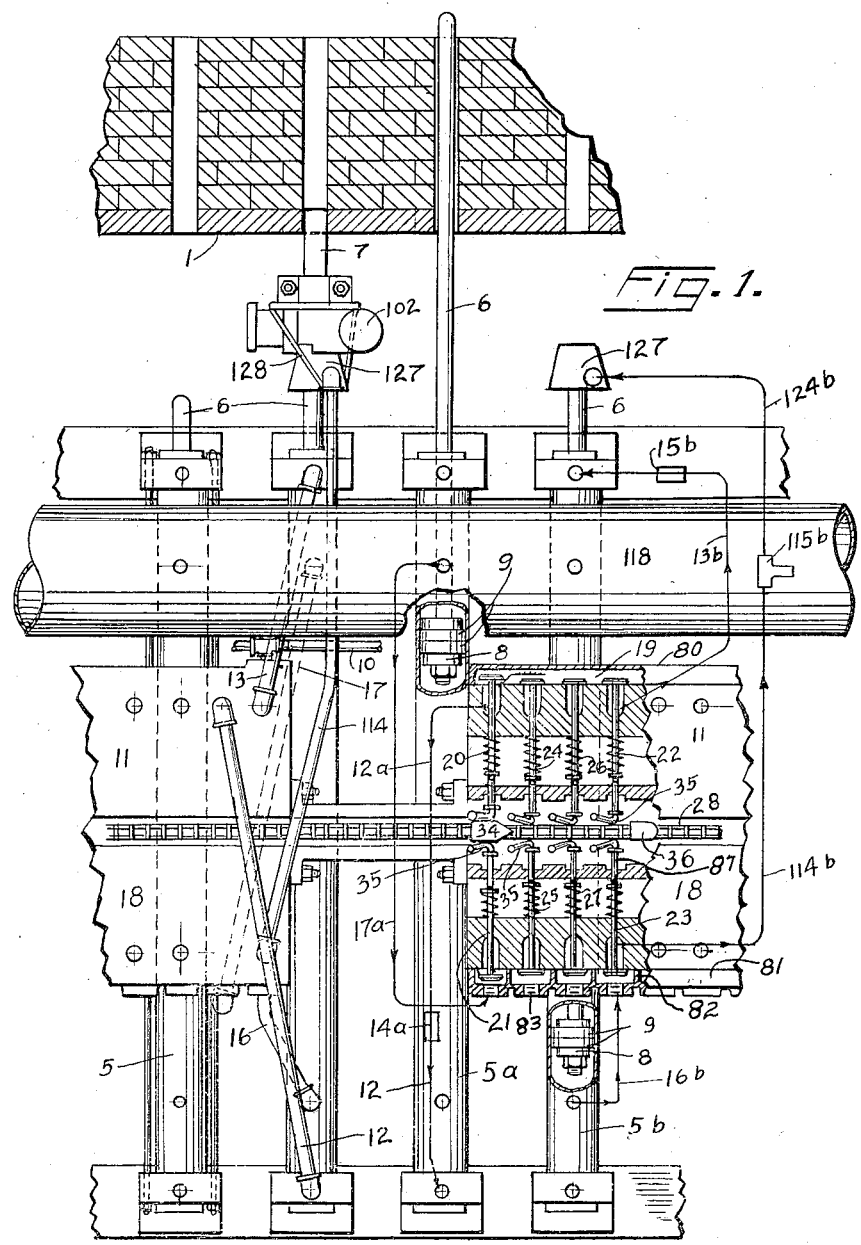
Fig. 1 is a fragmentary assembly view.
Figure 2:
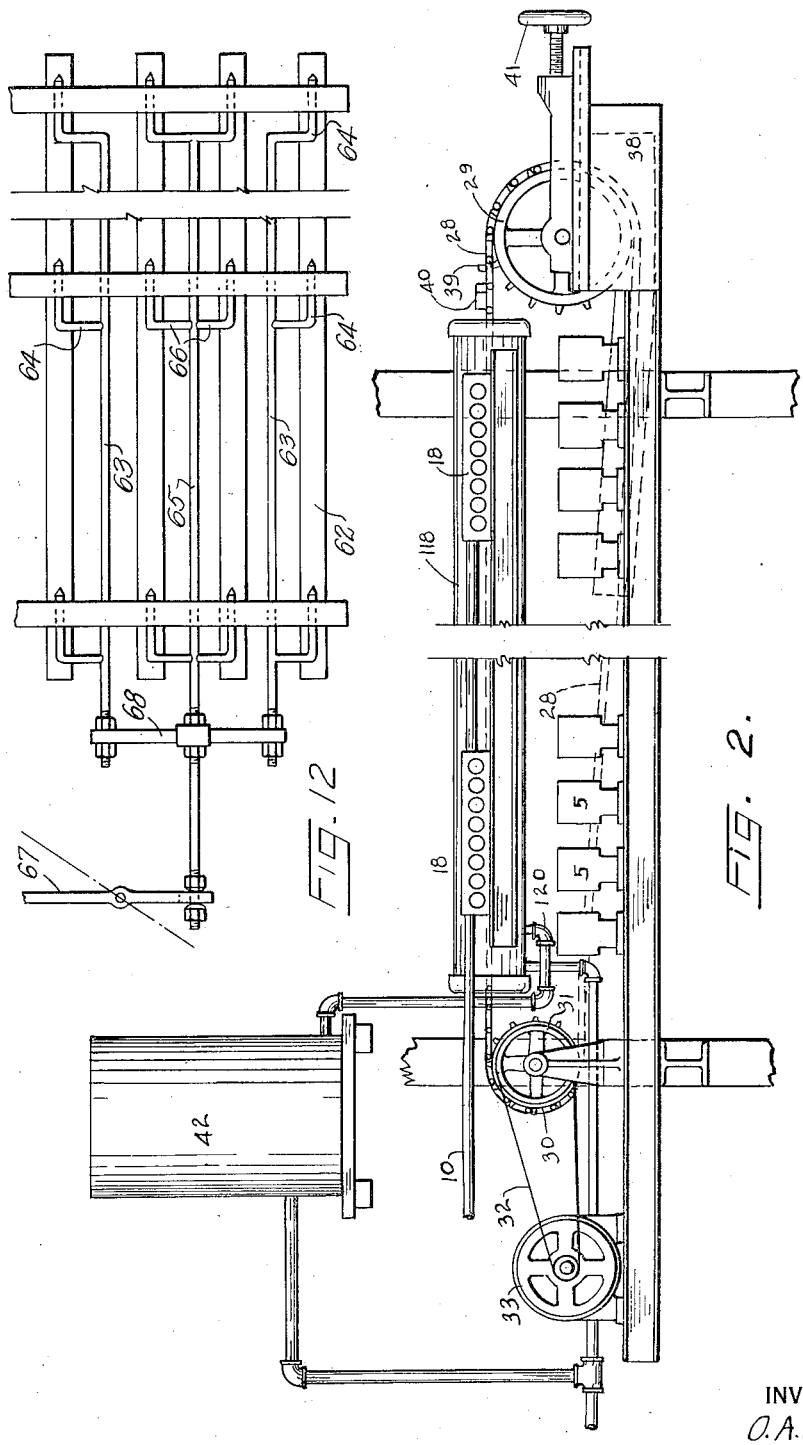
Fig. 2 is a rear end elevational view, with repetitive parts eliminated.

Air is admitted from air supply line 10 to chamber 19 which is common to all the inlet valves for that group. As shown in Fig. 1, the arrow lines to cylinder 5a indicate the flow of air during the punching stroke of bar 6, while similar lines applied to cylinder 5b show the flow thereof on the return stroke of said bar, the said lines being designated by the same numerals as the corresponding pipes, but with the addition of the subscript letter which is used to designate the corresponding cylinder. The air flows from the said chamber through the port controlled by valve 20, through pipe 12a and check valve 14a to the outer end of cylinder 5a, and the exhaust from the other end of said cylinder is moving through pipe 17a to valve 21 whence it passes into the atmosphere. On the return stroke, illustrated on cylinder 5b, the air under operating pressure passes from valve 22 to the inner end of said cylinder 5b through pipe 13b and check valve 15b; the exhaust from the outer end of said cylinder on this stroke passes through pipe 16b to valve 23, thence through pipe 114b to pipe 115b which is filled with the lime wash above mentioned, the said wash being driven by said exhaust air through pipe 124b to the guide 127 where said wash is sprayed upon the retracting bar 6. The paths of the air during the two strokes are shown on different cylinders for the purpose of clarity of showing, but it is to be understood that but one cylinder is in operation at a time, and the flows of air shown on cylinders 5a and 5b are consecutive in the same cylinder, and not simultaneous on two different cylinders.

In actual operation, the valves 24 and 25 are respectively the valves which control the flow of air to and from the cylinder 5a during the return stroke of piston 8 in said cylinder, and valves 26 and 27 control the flow thereof during the punching stroke of bar 6 in cylinder 5b.

The head 80 of boxes 11 is shown in Figs. 20, 21, and 22, from which can be seen that it has a marginal flange which forms part of the enclosure of chamber 19. Head 81 of boxes 18 for the exhaust valves has a plurality of transverse partitions 82 so that it is divided into as many separate chambers as there are valves therein, with an aperture 83 leading into each of said chambers.

As seen in Figs. 26 and 27, a gasket 84 is placed under the head of each of the valves and the stems thereof pass through guides 85, with a spring 88 to hold said valves normally closed. Tappets 87 slidable in guides 86 transmit the movement of rocker arms 35 to the stems of said valves. The exhaust air passes out through lateral ports 89.

The means for actuating said valves comprises an endless sprocket chain 28 which is carried on sprocket wheels 29 and 30, or more than two if necessary, the latter having connected to it a pulley 31 which is driven through belt 32 from motor 33, though any suitable drive transmission may be substituted for the said pulley and belt. Mounted on said chain is a cam 34 whereof the forward end is laterally bevelled; as said cam is carried forward by movement of chain 28 it is drawn into contact with the rocker arms 35, which are pivotally mounted at one end and disposed so that an arm is moved into operative contact with the tappet of each valve by said cam, thereby opening the valves in their turns. It will be observed that an inlet valve and an exhaust valve are opened at the same time, so that air may escape from in front of the moving piston, as before set forth. In the position shown in Fig. 1 said cam has opened the valves 20 and 21 for the punching stroke, but a moment later it will have passed said valves 20 and 21 and permitted them to close, and will open valves 24 and 25 for the actuation of the piston on the return stroke. A short distance ahead of cam 34 is mounted on chain 28 an absorbent pad 36, which is passed through oil pan 30 and saturated with oil, and when thereafter said pad is drawn between the ends of arms 35 it will smear said arms with oil, as also the pivots of said arms, to prevent wear of said arms and pins. Chain 28 carries a lug 39 which operates an electric switch 40 and stops motor 33 when all the tuyères have been punched. A tensioning means to tighten chain 28 is operated by handwheel 41 to keep said chain properly taut by changing the position of sprocket 29.

Tank 42 contains a mixture of lime and water to be applied to bars 6 as they are retracted to prevent adhesion of material from within the converter to said bars, and said mixture is carried through pipe 120 to the pipe 118.

The device to guide the punching bar 6 infallibly into alinement with the tuyère and to clean off adhering slag or other matter from the interior of the converter comprises a base plate 100 with upstanding flanges 101 disposed as chords of the circle defined by the said base plate, each of said flanges having formed in it a semi-circular recess to receive the cylindrical housings 102 for the cleaning balls 103 and the springs 104 which hold said balls in operative position adjacent the aperture 105 in base plate 100 through which the bar 6 passes into the tuyère. A strap 107 having an arcuate intermediate portion to fit said housing and flat end portions secured to the coacting flange 101 fixes said housings in position. A cap 108 is attached to the outer end of each of said housings to hold springs 104 under suitable pressure.

The balls 103 are formed with an equatorial belt of hardened sharp-edged corrugations 109. At right angles to this belt is a spindle 110 which extends through the ball along a diameter; the said spindle is reduced at its ends and the said ends are slidable in slots 111 in housing 102. This manner of mounting the said balls insures that the belts of cutting edges will always be presented to the point of intersection of said belts if extended in a line inwardly. A washer 112 is placed beween the end of the spring 104 and said spindle. As bar 6 moves in toward the tuyère the end of said bar contacts said balls and spreads them apart so that said bar passes between them and the cutting edges of corrugations 109 are applied to the bar as the balls roll over said bar. When the bar 6 is retracted the balls, in rolling over said bar, cut or chip off any slag or other matter which has adhered to said bar while it was in the converter. An aperture 113 is formed in the cap of the lowermost housing 102 to permit any particles which are removed from the bar 106 and fall into said housing to drop through and so prevent the filling up of said housing with waste.

To reduce to a minimum the adhesion of slag to bar 6 the said bar is coated with lime or other substance having a like effect as it is being withdrawn from the tuyère. This is done by causing the exhaust air from cylinders 5 on the return stroke of said bar to pass through pipe 114, which pipe is bent downwardly as shown at 115 and connected to one side of T fitting 116. Said fitting is also connected to pipe 117 which extends upwardly and opens into a large pipe 118 that extends the length of the machine and is partially filled with a suitable mixture of lime in water, the level of which in pipe 118 is controlled by a valve operated by a ball float 119, the said mixture being supplied to pipe 118 from tank 42 through pipe 120. The mixture in pipe 118 is kept properly stirred by passing air therethrough from perforations 121 in pipe 122 which is connected to a supply of compressed air. The air so used for stirring is allowed to escape from pipe 118 by pipe 123, which has a bent portion that extends past the longitudinal center line of said pipe 118, so that the mixture will not be spilled out when the machine is tipped due to the rotation of the converter. Pipe 124 extends from fitting 116 to a point adjacent the end of the tuyère so that the lime mixture discharged from pipe 124 will be sprayed upon bar 6 while said bar is being retracted, and is formed with a down bent portion 125 adjacent its connection with T 116; this forms, in cooperation with the bent portion 115, a trap which will fill with the lime mixture, and the quantity of said mixture in said trap will be blown out each time the exhaust passes therethrough. The upper portions of the above-mentioned bent portions are above the level of the mixture in pipe 118 so that there will not be a continuous flow of said mixture through pipe 124.

Base plate 100 is provided with a bracket 126 which is adapted to receive tuyère 7 and lie along the lower side thereof, and is secured to the said tuyère by a coacting strap across the upper side of the tuyère and is fixed to said bracket 126.

Striking of bar 6 against the end of the tuyère is prevented by a hollow frusto-conical guide 127 for said bar which is fixed to plate 100 on the side thereof facing bar 6 by means of arms 128, with the larger base of said guide facing bar 6. A baffle 129 prevents bar 6 from striking the end of pipe 124 which is preferably connected into guide 127 and also prevents the lime mixture from passing out the large end of said guide without being applied to said bar. The axis of guide 127 is alined with opening 105 in the plate 100 and with the axis of the tuyère.

In some cases it may not be desirable to have the tuyère punching machine permanently fixed to the converter, and therefore a detachable modification has been devised, which is shown in Figs. 10 and 11.

Converter 50 is rotatably mounted on suitable supports 51. Supporting arms 52 are fixed to the shell thereof, and made more rigid by bracing members 53. Downwardly extending hangers 54 are carried by said supports 51, each of said hangers terminating at its lower end in a conical portion wherein is formed an aperture 55 parallel to the axis of the converter. The supports 51 are spaced a considerable distance apart, and between them are disposed conical members 56 similar to the conical portions on said hangers, and similarly having apertures 57 therein.

Each of the spaced parallel beams 58 carries a fitting 59 with a conical recess therein to co- act with each of the conical members 56, said fittings having apertures therein to register with the apertures 57 in said fittings so that pins can be passed through said fittings and said members 56 to lock them together. In like manner, beams 60 carry fittings 61 similar to fittings 59 to co-act with the conical portions on hangers 54 and to be locked thereto. The conical interfitting parts on the hangers and in the fittings are employed so that the accurate alignment of the parts carried by said beams with the tuyères 7 may be rapidly accomplished after the said beams have been disconnected from the supports 52. Cylinders 5 are mounted on beams 60 so that the punching bars 6 therein will be aligned with tuyères 7, and the boxes 18 which contain the valves to control the operation of bars 6 are carried on beams 58. All parts of the operating mechanism which are not necessary to clearness have been omitted from the figures relating to the detachable modification for sake of simplicity and clearness in the drawings. Beams 58 and 60 are connected together by means of tie members 67.

A system of pins for locking the parts together as above mentioned is shown in Fig. 12. A suitable supporting and guiding framework 62 in which said locking pins are slidably mounted is provided. Rods 63 carry pins 64 for locking the fittings 61 to hangers 54, and rod 65 carries pins 66 for locking fittings 59 to members 56, both the rods and pins being slidable in said frame. Rod 65 is extended to be connected to a pivotally mounted lever 67 and rods 63 are connected to cross member 68 which is also connected to rod 65 whereby said rods and pins may be moved in either direction.

A rack 69 is disposed alongside converter 50 in such position that said converter can be rolled to cause conical members 70 to be received in the conical recesses in fittings 71 on said rack, where they are locked by causing pins 72 on rod 73 to pass through aligned apertures in said fittings and said members 70, rod 73 being actuatable by pivotally mounted lever 74 connected thereto. When it is desired to tap the metal from the converter 50 said converter is rolled so that members 70 are in fittings 71, and lever 74 is actuated to move pins 72 to lock said members in said fittings, and lever 67 is moved to unlock members 56 from fittings 59 and hangers 54 from fittings 55, and the converter can then be rolled over in the other direction for tapping without having to carry the weight of the entire tuyère punching mechanism during such movement, and thus also eliminating the necessity of changing the position of the hood above the converter, as the said mechanism will remain on rack 69. After tapping is completed converter 50 can be rolled back to reconnect said mechanism to the converter, and through the use of the conical members and recesses all parts will be accurately positioned and ready for operation as soon as connected.

Operation

Assuming that the mechanism has been assembled in position, with the bars 6 in cylinders 5 properly aligned with the tuyères 7 of the converter, that tank has been supplied with the lime wash, and that air supply line 10 has been connected to a source of compressed air, the operation of the machine is as follows:

Motor 33 is started, which drives sprocket wheel 30 and sets chain 28 in motion, and cam 34 is carried between the first pair of rocker arms 35, thus opening valve 20 to admit air to cylinder 5 through pipe 12 to drive bar 6 outwardly, and also opening valve 21 to permit the escape of air from said cylinder from in front of the piston 8 through pipe 17 to the said valve 21 and thence out into the open air, but leaving the air between the point where pipe 17 communicates with the interior of said cylinder and the front end of said cylinder to serve as an air cushion to check the momentum of bar 6 and its piston 8.

An instant thereafter cam 34 will have passed to the next pair of arms 35 and will have opened valve 24 to admit air through pipe 13 to the front end of the said cylinder 5 to withdraw the bar 6 from the tuyère, and also valve 25 which permits escape of air from cylinder 5 as said piston moves back, the air thus driven from said cylinder passing through pipe 16 to valve 25, whence it goes through pipe 114 to the trap-like downwardly bent portions 115 and 125 which are filled with the lime wash from large pipe 118, forcing out all the said wash which is in said down-bent portions through pipe 124 to guide 127 where said wash is spread upon bar 6 as said bar is withdrawn from tuyère 7. In this manner each one of the bars in the assembly of cylinders mounted to punch the tuyères of a converter will be actuated in turn by the passage of cam 34 between the arms 35 which actuate the valves thereof, first to move the bar in the punching stroke and then to retract said bar from the tuyère until said cam has passed through the entire length of the assembly, when it is carried back to the starting point by the continual travel of chain 28 and the cycle is repeated.

Oil pad 36 moves between arms 35 a short distance ahead of cam 34 and smears said arms with oil so that they are well lubricated for the passage of said cam therebetween. The stems and tappets of the valves actuated by said arms may be lubricated by a suitable arrangement of wicks having a portion contacting the said stems and tappets and the main body thereof dipping into oil in a reservoir.

As bars 6 move outwardly on the punching stroke they are guided into the tuyères by the hollow frusto-conical guides 127. In case of small changes in the position of the ends of the tuyères 7, due to temperature changes, the said bars will slide along the sloping inner surfaces of said guides and into the tuyères, whereas, if such guides are not provided and differences of position of the ends of the tuyères would cause bars 6 to strike against said tuyères, damage to both tuyères and bars would result and probably to the mechanism which operates said bars also.

There will frequently be some slag or other material from within the converter which will adhere to the bars 6 when they are withdrawn from the tuyères, so the cleaning device shown in Figs. 6, 8, and 9 has been devised. As the direction of the axis of rotation of balls 103 is fixed the cutting edges 109 thereon will necessarily always be presented to the bars 6 when said bar is between said balls, and the springs 104 will exert sufficient pressure on said balls so that the said cutting edges will be in effective contact with such bars and will chip off any material which may be adhering thereto.

In Figs. 28 to 34 is shown a modification which has but one cylinder 200 which travels along track 201 to each tuyère in turn, said track being supported on a frame 202 which is fixed to converter shell 203.

A crank-shaft 204 is driven by a gear 205 thereon which meshes with a pinion 206 which is driven by a motor 207. Said cylinder is fixed to a chain 208 carried on sprockets 209 and 210. On said chain are blocks 211 spaced the same distance apart as are said tuyères, and a pusher arm 212 on said crank engages said blocks and pushes chain 208 forward a distance to move cylinder 200 to another tuyère at each revolution of said crank-shaft. A two-way limit switch 213 is actuated by pin 214 which turns off the current from electromagnet 215, which magnet normally holds armature 216 and the attached rod 217 toward itself and keeps clutch 218 inoperative, and permits spring 219 to draw said rod back so that clutch 218 becomes operative and drives gear 220 which is moved into engagement with gear 221 when said clutch is made operative as said gear 220 is connected to the same sleeve 222 as the movable plate of said clutch. Gear 221 is keyed to the shaft 223 on which sprocket 210 is keyed and so reverses the direction of movement of chain 208 and carries cylinder 200 back to the starting point, where it is stopped by block 224 and on said chain actuating two-way switch 225 which turns the current again through magnet 215, which draws rod 217 over against the pull of spring 219, thus moving pivoted lever 226 that moves the movable plate of clutch 218 and disengages said plate and renders the said clutch again inoperative. A momentum brake 227 is operated by block 224, which sets said brake and prevents said cylinder from being carried beyond the first tuyère by the movement of rotation of the motor. Magnetic brake 275 is carried by guide 276 and is so connected that when cylinder 200 is in position to punch a tuyère said brake is drawn against rail 201 and prevents movement of said cylinder during the punching. Guides 276 and 277 slide along under the upper flange of said rail and keep the cylinder 200 in an accurately horizontal position, and they are of sufficient length that they prevent any tendency of said cylinder to turn from its position at right angles to said rail.

An arm 230 is carried by rod 217, said arm sloping upwardly from its free end, which said end is disposed below pusher arm 212, so that when rod 217 is drawn away from magnet 215 by spring 219 said arm 230 will lift said pusher arm 212 so it will clear blocks 211 and will not interfere with the reverse movement of chain 208.

Drag brake 231 acts constantly upon shaft 223 to insure that the momentum of cylinder 200 will not carry said cylinder beyond the proper position for punching a tuyère, but will stop as soon as forward movement of chain 208 ceases at the end of forward movement of pusher arm 212.

Rotating plate 232 of a rotary valve 233 is carried on shaft 204, said plate having an air chamber 234 therein. One face of said plate is ground to form a tight fit with the stationary plate 235 of said valve. An aperture 236 leads from chamber 234 to said face of plate 232, adjacent the periphery of said plate, and a radially extending elongated recess 237, is formed in said face with its longer axis radially aligned with the said aperture. Holes 238, 239, and 240 are formed in fixed plate 235 to register with aperture 236, and the radially outer and inner ends, respectively, of recess 237, to control flow of air during the punching stroke, and similarly disposed holes 238a, 239a, and 240a for the return stroke. Concentric segmental arcuate depressions 242, 243, and 244 lead to said holes from both rotational directions so that said holes are in connection with aperture 236 and recess 237 for a longer period than would be the case if the holes only were used. Pipe 245 is connected to hole 238 and to the back end of cylinder 200 to supply air for the punching stroke, said air following the line of flow on Figure 28. The exhaust from the forward end of said cylinder during this stroke passes through pipe 246 to hole 239, recess 237, and hole 240 whence it issues to the atmosphere through pipe 247. The air to move bar 6 on the return stroke passes through holes 238a and pipe 248 to the forward end of cylinder 200 where it acts upon piston 8 to drive bar 6 back, the exhaust from the back end of said cylinder passing through pipe 249, hole 239a, recess 237, hole 240a, and pipe 250 to the trap portion 251 which is filled with lime water wash from container 253, said wash being expelled from said portion through pipe 252 and spread on bar 6, for the purpose heretofore set forth. Air for actuating bar 6 is introduced into chamber 234 by pipe 254, on which plate 232 is rotatable, and passes from said chamber through hole 236 to said cylinder as above indicated. It is to be noted that the operation of bar 6 occurs during that half of the rotation of crank-shaft 204 when pusher 212 is being retracted and cylinder 200 is stationary.

The tuyères are not all equally spaced, as it is necessary to allow a sufficient distance between certain ones thereof for bands or hoops around the converter. To allow for this unequal spacing additional blocks 255 are mounted on chain 208 at a distance from the ones immediately preceding equal to the excess of distance in such spacing of the tuyères, so that it requires two revolutions of crank-shaft 204 to move cylinder 200 between two tuyères on opposite sides of such hoops. Actuation of bar 6 is prevented during the first of such two revolutions by securing a cam 256 to the side of chain 208 in the proper position to move a spring controlled plunger 263 in a contact device 257 which closes a circuit through electro-magnet 258 and draws armature 259 toward said magnet. Attached to said magnet is a bar carrying a rack 260 engaged with a segmental pinion 261 on the stem of a four-way valve 265, so that attraction of armature 259 rotates said valve to close completely the pipe 262 which supplies air under pressure for operating the bar 6. When cam 256 has passed plunger 263 the circuit through magnet 258 is broken and spring 264 draws rack 260 back so that valve 265 is opened. A like four-way valve 266 is actuated through rack 267 on rod 217 engaged with segmental pinion 268 on said valve 266, so that as rod 217 is moved to engage the plates of clutch 218 valve 266 is closed to prevent admission of air to cylinder 200 during the reverse movement of said cylinder back to the first of the tuyères to be punched, it being obvious that the ports of the rotary valve mechanism must be in registry several times during such reverse movement.

Fig. 29 shows the wiring diagram of the limit switches 213 and 225 which control the movement of cylinder 200 and the manually operated switch 273 which the operator throws to govern the mechanism. Assuming that the switches 213 and 225 are in the positions contacting poles 269 and 270, respectively, as shown in said figure, magnet 215 and motor 207 will both be on closed circuit and the piston will be travelling along the converter, punching the tuyères. After the last tuyère has been punched switch will be thrown, by engagement of pin 214 therewith, into contact with pole 271. Inasmuch as blade 272 of manually operated switch 273 is positioned to close the circuit through pole 269 magnet 215 is on open circuit while motor 207 remains on closed circuit through blade 274 of switch 273 closing the circuit through pole 270, and the cessation of current through magnet 215 permits spring 219 to draw rod 217 back to engage clutch 218 so that cylinder 200 is moved back to the starting position, air being cut off from the rotary valve mechanism by the closing of valve 266 so that bar 6 is not actuated during that time, and pusher arm 212 is lifted up by arm 230 so said pusher arm clears blocks 211 and 255. At the end of the backward movement of said cylinder, switch 225 is actuated by block 224 so that switch 225 is moved into contact with pole 275', and both motor 207 and magnet 215 are on open circuits. When it is desired to start punching again the operator throws switch 273 so that blades 272 and 274 thereof occupy the dotted line positions and both said motor and said magnet are again actuated, starting said motor, and attracting armature 216 so that clutch 218 is disengaged and valve 266 is opened, thus moving cylinder 200 forward and permitting the actuation of bar 6 by the air through said rotary valve.

Without describing again the functioning of the switches, which has just been detailed above, the mode of operation of this modification is as follows:

During the half-revolution of crank-shaft 204 from the most retracted position of pusher arm 212 with respect to chain 208 and the most extended position thereof with respect thereto, said arm is engaged with one of the blocks 211 and is moving cylinder 200 forward, the openings in valve plates 235 and 232 being out of registry. During substantially the next quarter-revolution of said shaft aperture 236 and recess 237 are in registry with holes 238, 239, and 240 on the punching stroke of bar 6, and in the next quarter-revolution the said aperture and the said recess are in registry with holes 238a, 239a, and 240a on the return stroke of said bar, during which time the exhaust air sprays said bar with lime wash, as heretofore set forth.

When one of the extra spacings of the tuyères is reached at one of the hoops around the converter pusher arm 212 engages a block 211 and moves chain 208 forward the usual distance, the cam 256 then being in position to close the circuit through magnet 258 and operate valve 265 to shut off the air supply line 262. Arm 212 is retracted as usual thereafter, but slides forward over chain 208, on the extending portion of its movement, until it reaches a block 255, which it then engages and moves chain 208 forward the extra distance necessary, during which time cam 256 has moved on and spring 264 has again opened valve 265, so that air may be admitted to cylinder 200 by registry of the ports in the valve plates 232 and 241.

The end of the forward movement having been reached, switch 213 is thrown by pin 214 to open the circuit through magnet 215 whereby armature 216 and the rod 217 fixed thereto are released and drawn back by spring 219, shutting off the air from the rotary valve by closing valve 266 and causing the engagement of the plates of clutch 218 through lever 226, and moving gear 220 into mesh with gear 221 so that chain 208 and cylinder 200 thereon are moved back. At the limit of backward movement of said cylinder switch 225 is thrown by block 224, so that current is cut off from motor 207 and lever 228 is also actuated by said block to set brake 227 so that the moment of rotation of said motor will not carry said cylinder back beyond the first tuyère.

Manipulation of switch 273 by the operator, as hereinabove set forth, starts another cycle of punching the tuyères.

The purpose of four-way valves 265 and 266 is to permit the escape of all air from chamber 234 and the pipes connected thereto so that there shall be no air under pressure in the system to pass through valve 233 into cylinder 200, as such might move punching bar 6 out sufficiently to strike against a tuyère while said cylinder is moving, with resultant damage to the mechanism.

I claim:

1. In a device of the class described, a member adapted to be inserted through a tuyère of a metallurgical device, means to reciprocate said member, and means to apply to said member a substance to prevent tight adhesion of material in said metallurgical device to said member.

2. In a device of the class described, a member adapted to be inserted through a tuyère of a metallurgical device, means to reciprocate said member, mechanism to remove adhering matter from said member as said member is being withdrawn from said tuyère, and means to apply to said member a substance to prevent tight adhesion of material in said metallurgical device to said member.

3. In a device of the class described, a member adapted to be inserted through a tuyère of a metallurgical device, a piston on said member, a cylinder in which said piston is reciprocable, an inlet port at each end of said cylinder, an exhaust port spaced from each of said inlet ports, and valve means adapted to open simultaneously an inlet port at one end and an exhaust port at the opposite end of said cylinder.

4. In a device of the class described, a member adapted to be inserted through a tuyère of a metallurgical device, a piston on said member, a cylinder in which said piston is reciprocable, an inlet port at each end of said cylinder, an exhaust port spaced from each of said inlet ports, valves disposed in opposed pairs, one valve of each pair controlling one of said inlet ports and the other valve of each pair controlling the exhaust port at the opposite end of the cylinder from the inlet port last mentioned, and means to operate the valves of a pair simultaneously and the two pairs relating to each cylinder seriatim.

5. In a device of the class described, a plurality of cylinders disposed parallel and adjacent each other, a member adapted to project into a tuyère of a metallurgical device reciprocably mounted in each of said cylinders, an inlet port opening into each end of each of said cylinders, an exhaust port spaced from each of said inlet ports, a valve to control each of said ports, said valves being arranged in oppositely disposed pairs with the inlet valve for one end of each cylinder opposite the exhaust valve for the opposite end of said cylinder, the valves for a number of cylinders being mounted in a group to be operated seriatim, a pivoted arm mounted to be swingable to open each of said valves, a travelling member mounted to move between the arms for one set of valves and the arms for those valves disposed opposite thereto, and a cam having a bevelled forward end carried on said travelling member adapted to move said arms to open said valves.

6. In combination, a plurality of devices having ports opening thereinto, a valve disposed to control each of said ports, the said valves being arranged in opposed groups, a pivotally mounted arm adapted to swing to open each of said valves, a travelling member mounted to move between said arms for said opposed groups, a cam on said travelling member adapted to swing said arms to open said valves, a lubricating pad on said travelling member forwardly of said cam adapted to apply lubricant to said arms, and means to supply lubricant to said pad.

7. In combination, a plurality of devices having ports opening thereinto, said devices being bodily rotatable through an arc, a valve disposed to control each of said ports, the said valves being arranged in opposed groups, a pivotally mounted arm adapted to swing to open each of said valves, an endless travelling member mounted to move between said arms for said opposed groups, a cam on said travelling member adapted to swing said arms to open said valves, a lubricating pad on said travelling member forwardly of said cam adapted to apply lubricant to said arms, means to supply lubricant to said pad when on the lower side of said travelling member comprising a troughlike portion adapted to contain lubricant when the side walls thereof are substantially vertical and a substantially enclosed portion fixed to one wall of said troughlike portion with an opening along the juncture of said enclosed portion with said wall whereby the lubricant from said troughlike portion is received into said enclosed portion when said devices are rotated, and whereby said lubricant runs back to said troughlike portion when the original position is resumed.

8. In combination, a member adapted to be passed into the tuyères of a metallurgical device, a cylinder in which said member is reciprocable, a piston on said member, ports to admit fluid pressure to said cylinder, to reciprocate said member, said ports including an exhaust port which is open during the backward movement of said member, a container for substance to prevent adhesion of material in said device to said member, a pipe connected to said exhaust port and disposed to discharge upon said member, and means to admit a portion of said substance from said container to said pipe.

9. In combination, a member adapted to be passed into the tuyères of a metallurgical device, a cylinder in which said member is reciprocably mounted, a piston on said member, ports to admit fluid pressure to said cylinder, to reciprocate said member, said ports including an exhaust port which is open during the backward movement of said member, a container for a substance to prevent adhesion of material in said device to said member, a pipe connected to said exhaust port and disposed to discharge upon said member, said pipe being formed with a downwardly bowed portion, said portion being so disposed that the uppermost parts thereof are substantially at the height of the predetermined surface level of the substance in said container, means connecting said downwardly bowed portion with said container, a source of supply of said substance connected to said container, and automatically acting means to control the level of the surface of the said substance in said container.

10. In combination, a member adapted to be passed into the tuyères of a metallurgical device, a cylinder in which said member is reciprocably mounted, a piston on said member, ports to admit fluid pressure to said cylinder, to reciprocate said member, said ports including an exhaust port which is open during the backward movement of said member, a container for a substance to prevent adhesion of material in said device to said member, a pipe connected to said exhaust and disposed to discharge upon said member, said pipe being formed with a downwardly bowed portion, said portion being so disposed that the uppermost parts thereof are substantially at the height of a predetermined surface level of the substance in said container, means connecting said downwardly bowed portion with said container, means to agitate the substance in said container, and automatically acting means to control the level of the surface of the said substance in said container.

11. In combination, a member adapted to be passed into the tuyères of a metallurgical device, a cylinder in which said member is reciprocably mounted, a piston on said member, ports to admit fluid pressure to said cylinder, to reciprocate said member, said ports including an exhaust port which is open during the backward movement of said member, a container for a substance to prevent adhesion of material in said device to said member, a pipe connected to said exhaust port and disposed to discharge upon said member, said pipe being formed with a downwardly bowed portion, said portion being so disposed that the uppermost parts thereof are substantially at the height of a predetermined surface level of the substance in said container, means connecting said downwardly bowed portion with said container, pneumatic means to agitate the substance in said container, a valve through which said substance is admitted to said container, and a ball float operatively connected to said valve to control the level of the surface of the said substance in said container.

12. In combination, a metallurgical device having tuyères, means having a member adapted to be passed into a tuyère, and means to remove adhering material from said member as said member is being withdrawn from said tuyère comprising a supporting body, housings disposed to converge to the center thereof, elements having cutting portions carried in said housings, and means to force said elements outwardly from said housings.

13. In combination, a metallurgical device having tuyères, means having a member adapted to be passed onto a tuyère, and means to remove adhering material from said member as said member is being withdrawn from said tuyères comprising a supporting body, housings disposed to converge to the center thereof, a ball having an equatorial zone of cutting edges in each of said housings, and means to retain the balls in said housings so that the said edges are always presented to act on a member inserted between the several balls.

14. In combination, a rotatable metallurgical device having tuyères, a supporting structure carried by the shell of said device, mechanism carried by said structure, said mechanism including a member adapted to be passed into a tuyère and means to reciprocate said member, coacting parts carried by said structure and said mechanism for detachably connecting said mechanism to said support, means to lock said mechanism to said support, and means to hold said mechanism when detached from said support on said device.

15. In combination, a rotatable metallurgical device having tuyères, a supporting structure carried by the shell of said device, mechanism carried by said structure, said mechanism including a member adapted to be passed into the tuyère and means to reciprocate said member, locking coacting parts for detachably connecting said mechanism to said support including male members on said supporting structure, female members on said mechanism, adapted to receive said male members, a rack to hold said mechanism when detached from the support on said device, female members to receive male members on said mechanism, all of said male and female members having apertures disposed to register with apertures of the parts wherewith they coact, and simultaneously actuatable members disposed to be passed through said apertures to lock said coacting members together.

16. In combination with a machine having a part reciprocable by fluid pressure and a plurality of ports to admit said pressure to said machine and whereof more than one of said ports is to be opened at a time, a valve mechanism comprising a member having a duct therein for passage of fluid under pressure and an aperture through said member from said duct to the inner face thereof, means to convey said fluid to said duct, an elongated recess in the said face of said member adjacent said aperture having its greater axis substantially alined with the center of the said aperture, a second member disposed against said inner face of said first-mentioned member and movable relatively to said first-mentioned member, the said second member having a plurality of groups of apertures, the apertures in each group being so disposed that one thereof will be in registry with the aperture in said first-mentioned member and the others of a group will at the same time be in registry with said recess, and means to actuate one of said members.

17. In combination with a machine having a part reciprocable by fluid pressure and a plurality of ports to admit said pressure to said machine and whereof more than one of said ports is to be opened at a time, a valve mechanism comprising a member having a duct therein for passage of fluid under pressure and an aperture in said member from said duct to the inner face thereof, means to convey said fluid to said duct, an elongated recess in the said face of said member adjacent said aperture having its greater axis substantially aligned with the center of the said aperture, a second member disposed against said inner face of said first-mentioned member and movable relatively to said first-mentioned member, the said second member having a plurality of groups of apertures, the apertures in each group being so disposed that one thereof will be in registry with the aperture in said first-mentioned member and the others of a group will at the same time be in registry with said recess, means to actuate one of said members, and means to stop the moving member automatically at a predetermined point.

18. A device of the class described, comprising a bar adapted to be passed into the tuyères of a metallurgical device, a cylinder in which said bar is slidably mounted, a rail on which said cylinder is slidably mounted, means to move said cylinder along said rail, means to hold said cylinder accurately positioned with respect to said rail, and means to supply fluid under pressure to said cylinder to actuate said bar.

OSCAR A. OLMSTEAD.